Feb. 24, 1970    E. E. CHILDRESS ET AL    3,497,133
COMBINATION ELECTRICAL AND PNEUMATIC POWER SUPPLY
Filed Aug. 28, 1968
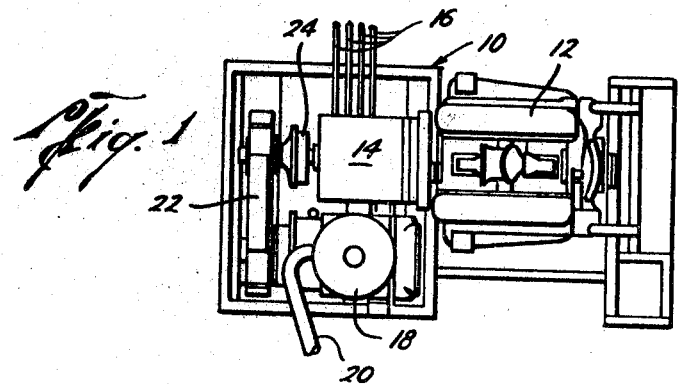
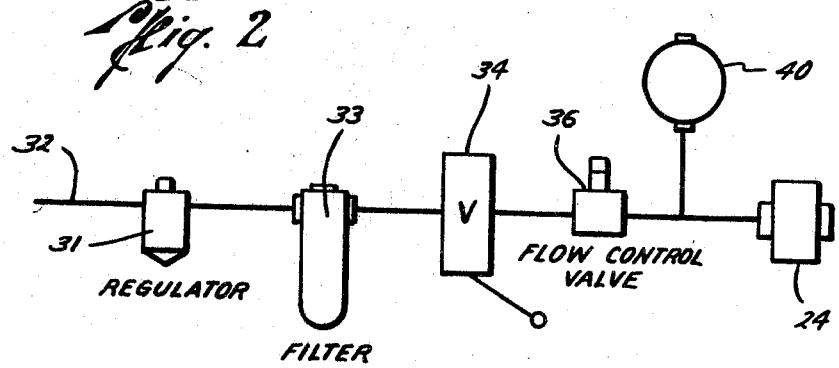
Ezra E. Childress
George R. Witte,
INVENTORS
ATTORNEYS United States Patent Office 3,497,133
Patented Feb. 24, 1970

3,497,133
COMBINATION ELECTRICAL AND PNEUMATIC POWER SUPPLY
Ezra E. Childress and George R. Witte, Houston, Tex., assignors to Stewart & Stevenson Services, Inc., Houston, Tex., a corporation of Texas
Filed Aug. 28, 1968, Ser. No. 756,056
Int. Cl. F04b 49/02
U.S. Cl. 230—15    3 Claims

ABSTRACT OF THE DISCLOSURE

An apparatus for simultaneously providing electrical and pneumatic power from a single minimum rated power source for utilizing the power source to power a generator for providing electrical power, and slowly engaging an air actuated clutch connected to an air compressor to start and gradually increase the speed and output of an air compressor without adversely decreasing the frequency output of the electrical generator. A combination electrical ground power supply and air start unit for a jet aircraft engine having a diesel engine, and electrical generator connected to the diesel engine, and air actuated clutch connected between the diesel engine and the air compressor and a first valve supplying the air supply to the clutch and a flow control air valve connected to the air supply limiting the volume of air flowing to the clutch, and an accumulator tank connected to the supply line at a point between the flow valve and the clutch for receiving a portion of the air flow to the clutch thereby limiting the speed of engagement of the clutch and permitting the engine to bring the compressor up to full speed without adversely reducing the frequency of the generator.

BACKGROUND OF THE INVENTION

Auxiliary ground power equipment using a gasoline or diesel engine as a prime mover for actuating a generator or air compressor to supply electrical power and/or pneumatic power is old. However, in order to provide a combination electric and pneumatic power supply driven from a single prime mover, the prime mover in the past has been required to be greatly oversized for the running loads in order to satisfactorily carry the starting loads. By way of example only, a ground electrical power unit for an aircraft may require a power supply of 400 cycles per second in which the frequency limit is plus or minus 2%. Therefore, even though the air compressor may only be utilized for a short period of time in order to provide sufficient power to start up an air compressor to supply the pneumatic air power, the prime mover engine is required to be sized sufficiently great so that the starting load imposed by the air compressor as it is being brought up to e speed does not slow the electrical generator down to cause a change in the electrical output frequency of more than 2%. Of course, the use of an oversized prime mover increases both the initial costs and the operation costs of the unit. The present invention is directed to providing an apparatus for simultaneously providing electrical and pneumatic power from a single minimal rated power source by allowing the prime mover to slowly pick up the air compressor load without adversely affecting the output of the electrical generator.

SUMMARY OF THE INVENTION

The present invention is directed to an apparatus for simultaneously providing electrical and pneumatic power from a single minimum rated power source by connecting the electrical generator to the power source for providing the electrical power supply, and providing an air actuated clutch between the prime mover and the air compressor, and means for slowly engaging the clutch for allowing the prime mover to gradually bring the compressor up to full speed without slowing down the prime mover and thus the generator more than a predetermined amount.

The present invention is further directed to providing a combination electrical power supply and pneumatic air supply unit operated from a single minimum rated power source by providing an air actuated clutch connected between the prime mover and the air compressor in which an accumulator tank is connected to an auxiliary air supply and to the clutch for receiving a part of the air supply and thus slowing down the engagement of the clutch and thus slowing down the loading of the prime mover by the compressor.

Still a further object of the present invention is the provision of a unit supply electrical ground power to an airplane and simultaneously starting a jet engine of the plane with an air supply by providing a combination unit starter having a single prime mover operatively connected to an electrical generator and an air actuated clutch for connecting the prime mover to an air compressor by providing an air supply line, a first valve in the air supply line supplying air to the clutch, a flow control valve in the air supply line limiting the volume of air flowing to the clutch, and an accumulator tank connected to the supply line at a point between the flow valve and the air clutch for diverting a portion of the air flow from the clutch thereby limiting the speed of engagement of the clutch and thus permitting the prime mover to bring the compressor up to full speed without adversely reducing the speed of the prime mover and the frequency of the generator.

BRIEF DESCRIPTION OF THE DRAWINGS

FIGURE 1 is an elevational view of the apparatus of the present invention, and
FIGURE 2 is a schematic control system for operation of the present invention.

DESCRIPTION OF THE PREFERRED EMBODIMENT

Referring now to the drawings, and particularly to FIGURE 1, the reference numeral 10 generally indicates the combination electrical and pneumatic power supply of the present invention and generally includes a prime mover, for example, a diesel engine 12 which is connected to an electrical generator 14, for example a three phase 140 kva., 400 cycle alternator which supplies electrical power leads 16 for an aircraft, and an air compressor 18 which supplies air through outlet 20 to an aircraft for, by the way of example only running pneumatic air conditioning or providing an air start for jet engines. The compressor 18 is suitably connected and driven by the prime mover 12 such as through a chain drive 22 and clutch 24 through the shaft of the generator 14.

Generally, the electrical generator 14 is connected to an aircraft to supply auxiliary electrical power while the aircraft is on the ground. However, the air compressor 18, in its use for starting jet engines, is only used for a short period of time just prior to aircraft takeoff and thus just provides a load for a short period of time. While the prime mover 12 need only be sized at a certain rating to be adequate to carry the full load of both the generator 14 and the air compressor 18, the prime mover 12 would have to be greatly increased in size to pick up the starting lead of the compressor without slowing down the prime mover 12 and thus the generator 14 and objectionable amount. For example, the electrical system of the aircraft requires that the steady state frequency of the electrical supply from the alternator 14 be held to plus or minus 2% of its rated frequency and in the event that the frequency does vary more than the allowed amount the switch will disconnect the alternator 14 from the aircraft's electrical system. While by way of example only, assuming that the diesel engine 12 need only be a 450 horsepower engine to adequately start the full load of the generator 14 and also carry the running load of the air compressor 18, it has been found that the engine would have to be sized approximately at 550 horsepower to carry the starting load of the air compressor 18 without slowing down the engine 12 and generator 14 and causing the frequency of the generator 14 to drop to an objectionable level.

The present invention is directed to an apparatus for simultaneously providing electrical and pneumatic power from a minimum rated power source by slowly engaging the clutch 24 to allow the air compressor 18 to be slowly brought up to full speed without slowing down the prime mover 12 and thus the generator 14 below a predetermined amount.

The clutch 24 is an air actuated clutch and the control system, as best seen in FIGURE 2, may be an air actuated control system for bringing the air compressor 18 slowly up to full speed. Thus the air clutch control system is connected to and receives air from line 32 which is connected to an auxiliary air supply and through a conventional regulator 31 and filter 33 and includes a manually operated off-on valve 34 which transmits air to the remainder of the control circuit for actuation of the clutch and when in the off position disconnects air from the control system and from the clutch for disengaging the clutch.

A flow control valve 36 is provided connected in the air supply line 32 to the clutch 24 to reduce the flow of air to the clutch. However, the valve 36 is unable, and is also unstable at low volumes of flow, to suitably limit the volume of air to the clutch 24 sufficiently to cause the clutch to engage slowly enough to permit the engine 12 to pick up the load of the air compressor 18 without dropping the frequency of the generator 14 to an objectionable level. Therefore, an accumulator tank 40 is provided connected to the supply line 32 at a point between the flow control valve 36 and the air clutch 24 thus diverting a portion of the air flow from the clutch 24 thereby limiting the speed of engagement of the clutch 24 and thus permitting the prime mover 12 to bring the compressor 18 slowly up to full speed without adversely reducing the speed of the prime mover 12 and without adversely reducing the frequency of the generator 14. Of course, the tank 40 is sized relative the size of the air clutch to engage the clutch at the desired speed. In the example previously given, it was found that if the tank 40 was sized to require approximately five seconds to fully engage the clutch 24, the prime mover 12 was able to pick up the load of the compressor 18 without adversely effecting the frequency of the generator 14. Of course, once the air clutch 24 is fully actuated, tank 40 has no further effect on the clutch 24. And when the valve 34 is shut off and disconnects the air supply to the clutch, the air is bled off from both the clutch 24 and the tank 40 in preparation for the next time of operation.

In operation, the combination electrical and air supply unit 10 is placed adjacent a plane or other object to be serviced and the electrical conductors 16 are connected to the electrical system of the aircraft. Similarly, the hose 20 is connected to the aircraft to perform the function of operating aircraft air conditioning in those aircrafts having such pneumatically operated systems or is connected to jet engines for providing an air start when desired. The engine 12 is started turning the generator 14 and thus supplying electrical power through the conductors 16. When it is desired to use the air compressor 18 the control system is designed to engage the clutch 24 slowly for bringing the air compressor 18 up to speed in a predetermined interval of time before locking in in order to prevent slowing down of the engine 12 and thus the electrical generator 14. Thus referring to FIGURE 2, the control circuit may be used to operate an air actuated clutch 24 in which auxiliary air is supplied to line 32 and controlled by manually actuated off-on control lever 34 which when put in the on positon transmits air through flow control valve 36.

From the flow control valve 36 air will flow both to the clutch 24 and the accumulator tank 40. However, since a portion of the air, depending on the relative size of the tank to the air clutch 24, will be diverted to the tank 40, the clutch 24 will be actuated slowly enough to permit the engine 12 to pick up the load of the air compressor 18 without dropping the frequency of the generator 14 to an objectionable level.

The present invention, therefore, is well suited and adapted to obtain the objects and attain the ends and has the advantages mentioned as well as other inherent therein.

What is claimed is:

1. A combination electrical power supply and air power supply for an aircraft comprising,
    a single prime mover,
    an electrical generator connected to the prime mover for providing an electrical power supply,
    an air compressor for supplying air to start the jet engine,
    an air actuated clutch connected between the prime mover and the air compressor,
    an air supply line connected to said clutch,
    a valve in said supply line, and
    a closed tank connected to the supply line at a point between the valve and the air clutch for limiting the speed of engagement of the clutch to gradually bring the compressor up to speed without adversely slowing the prime mover.

2. The apparatus of claim 1 wherein the prime mover is a diesel engine.

3. A combination electrical ground power supply and air start unit for a jet engine aircraft comprising,
    a single prime mover,
    an electrical generator connected to the prime mover for providing an electrical ground power supply for the aircraft,
    an air compressor for supplying air to start a jet engine,
    an air actuated clutch connected between the prime mover and the air compressor,
    an auxiliary air supply line,
    a first valve connected to said air supply line for supplying air to said clutch,
    a flow control valve in the air supply line limiting the volume of air flowing to the clutch, and
    an accumulator tank connected to the supply line at a point between the flow valve and the air clutch for receiving a portion of the air flow to the clutch thereby limiting the speed of engagement of the clutch and permitting the prime mover to bring the compressor up to full speed without adversely reducing the frequency of the generator.

References Cited

UNITED STATES PATENTS

| | | | |
|---|---|---|---|
| 887,252 | 5/1908 | Jackson | 230—15 |
| 2,009,001 | 1/1935 | Peterson | 230—15 X |
| 2,130,957 | 9/1938 | Kingsley | 230—15 X |
| 2,733,661 | 2/1956 | Surgi | 103—23 |
| 3,196,341 | 7/1965 | Gieb | 290—4 X |
| 3,345,517 | 10/1967 | Smith | 290—30 X |

WILLIAM L. FREEH, Primary Examiner

U.S. Cl. X.R.

290—1